E. L. BARNES.
Spirit-Level.

No. 159,882.                                             Patented Feb. 16, 1875.

Witnesses                  Edwin L. Barnes  Inventor
B. W. Williams             By his Att'ys
C. V. Thayer.              Henry W. Williams & Co.

THE GRAPHIC CO. PHOTO-LITH. 39 & 41 PARK PLACE, N.Y.

UNITED STATES PATENT OFFICE.

EDWIN L. BARNES, OF BOSTON, MASSACHUSETTS.

IMPROVEMENT IN SPIRIT-LEVELS.

Specification forming part of Letters Patent No. 159,882, dated February 16, 1875; application filed August 3, 1874.

*To all whom it may concern:*

Be it known that I, EDWIN L. BARNES, of Boston, in the county of Suffolk and State of Massachusetts, have invented a new and useful Improvement in Spirit-Levels, of which the following, when taken in connection with the accompanying drawings, is a full, clear, and exact specification:

In this invention an opening of the proper size and shape is made in the piece of wood, and embedded in one side of the opening is a spirit-level, while in the other side is set a small mirror at a suitable angle.

The object of the invention is to provide a spirit-level in which the air-bubble, or a reflection of it, may be seen when the level is held above the head of the person using it. In fact, this level may be used in any position above or below the head, and the position of the air-bubble perfectly ascertained.

Figure 1:
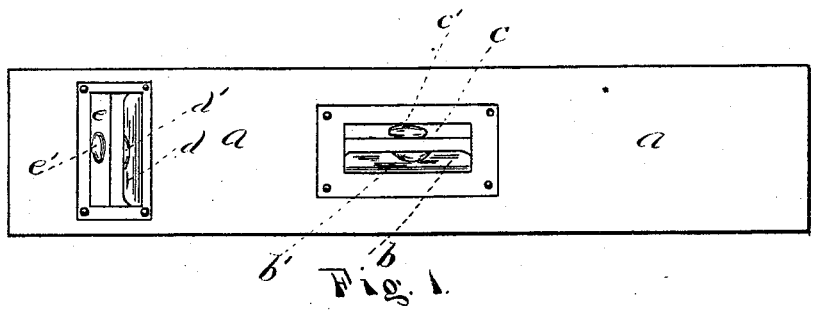
Figure 2:
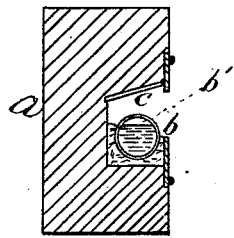

In the accompanying illustration, Figure 1 is a plan of a spirit-level embodying my invention. Fig. 2 is a cross-section of the same.

Similar letters of reference indicate corresponding parts.

$a$ is a flat piece of wood or metal, necessary of course in all spirit-levels. Set into one side of an opening cut in about the center of the piece $a$ is an ordinary spirit-level, $b$. This tube, chamber, or level $b$ is embedded in such a position that it may be readily seen. $b'$ represents the air-bubble. $c$ is a mirror, placed opposite the level $b$, at such an angle that the reflection $c'$ of the air-bubble $b'$ is visible to the user of the instrument, who may be holding it above his head.

A plumb-level is also represented in Fig. 1, constructed in a manner exactly similar to the level above described, $d$ being the tube; $d'$, the air-bubble; $e$, the mirror, and $e'$ the reflection of the air-bubble $d'$.

This method of constructing my invention may be somewhat varied without altering its principle, as, for example, the position of the tube $b$ may be somewhat changed; or, if desirable, two tubes or levels, $b$, may be embedded in the center of the opening, and be somewhat raised, so that their air-bubbles may be reflected in two mirrors, one upon each side the opening.

The advantage of this invention to persons desiring to ascertain the levelness of objects above and below them, when within reach, (upon buildings, for example,) will be fully appreciated, as many steps and much time are saved, and at the same time perfect accuracy is had.

Of course, any-shaped levels may be used with this invention.

Having thus fully described my invention, what I claim, and desire to secure by Letters Patent, is—

The combination, with the level $b$, of the mirror $c$, both set into an opening in the piece $a$ in the relative positions described above, and constructed and arranged substantially as herein specified, for the purpose of exhibiting the air-bubble or its reflection when the instrument is held above the head of the person using it.

EDWIN L. BARNES.

Witnesses:
HENRY W. WILLIAMS,
B. W. WILLIAMS.